Patented Sept. 5, 1939

2,171,595

UNITED STATES PATENT OFFICE 2,171,595

TUBE-DRAWING METHOD

John W. Offutt, Ellwood City, Pa., assignor to National Tube Company, a corporation of New Jersey No Drawing. Application August 12, 1936, Serial No. 95,681

3 Claims. (Cl. 205—8)

This invention relates to metallic tubing and more particularly to the manufacture thereof in small diameters, such as are used for hypodermic needles, instrument pressure lines, fuel injector tubing for Diesel engines, heat exchanger tubing for refrigerators, etc.

Small diameter seamless tubing is usually produced by successive cold drawing operations, each of which effects a diameter reduction and some of which may also effect wall reductions. In the earlier stages of the process when the hot rolled tubular blank is being cold drawn to smaller diameters and thinner walls, the inside diameter is large enough to permit the use of a stationary mandrel, which supports the inside diameter of the tube as it is drawn through the die, that reduces the diameter and wall thickness. When the inside diameter becomes so small that it is not practical to use a stationary mandrel, a hardened steel bar, rod or wire is inserted in the tube prior to its passage through the die, which controls the inside diameter similarly to the stationary mandrel described above.

This bar must be removed from within the tube after each passage through the die, as once the tube is reduced in diameter so that the tube is tight on the bar no further reduction or elongation can be made without reducing or elongating the bar itself; since in elongating the tube must travel in relation to the bar, which is impossible when the tube is once tightly drawn down on the bar. The bar is removed from within the tube after each cold drawing operation in order to anneal the tubular work-piece. This series of operations is very tedious and expensive.

It is among the objects of the present invention to effect the cold-reduction of small diameter metallic tubing without the mandrel difficulties heretofore encountered.

According to the method of the present invention, when the inside diameter of the work-piece becomes so small that the use of a stationary mandrel becomes impractical and uneconomical, the bore of the tubing is filled with a plastic non-metallic material, such as paraffin wax. This solid filler may be preformed or may be inserted under pressure or in a molten state. It is essential that this filler be composed of material which has a substantially lower melting point than that of the tubular work-piece.

The solid filler is confined in the bore of the tube and, being practically non-compressible, acts as a mandrel, or rod, whereby wall reduction as well as diameter reduction is effected when the tube is passed through the die. Both before and after drawing, the total volume of tubular work-piece and its solid filler is the same and the reduction in cross-sectional area is compensated by increase in length. The relationship between the cross-sectional areas of the tubular work-piece and the solid filler cannot change unless the latter escapes; therefore, the cross-sectional area of the wall must reduce in the same proportion as the solid filler.

When using a non-metallic plastic filler it may be necessary to close both ends of the tubular work-piece in order to prevent the extrusion of the solid filler as the die acts to reduce their cross-sectional areas. The tendency for the solid filler to extrude from the ends of the tube may be reduced by temperature control, as lower temperatures tend to retard the flow of plastic materials. The smaller the bore of the tube, the less tendency is there for the filler to flow from the ends thereof. This is because the frictional resistance between the solid filler and the tube is greater per unit of cross-sectional area in a small bore as compared with a large bore.

Tubes with non-uniform walls, such as taper gage tubes that have heavy walls on one end, light gage on the other, or heavy on both ends and light in the middle, etc., may be produced by this method. The filler would be of sufficient plasticity to flow freely under pressure, and by regulating its escape from the inside of the work-piece as it passes through the die portions of the tube could be reduced in diameter without wall reduction or even with a wall thickening, while other portions would have the proportional wall reduction described above.

As the heat generated by the working of the metal and friction in the die will tend to raise the plasticity and increase the volume of the filler, it may be found necessary to remove this heat promptly by some means of cooling to prevent the filler from extruding from the tube after its passage through the die.

A number of passes through progressively smaller dies may be made until the desired tube diameter is obtained, or the metal of the tube has been hardened to such an extent by the work performed that it is necessary to anneal it before further work can be done. In either case the solid filler may be removed by heating the tube until the filler becomes liquid, then permitting it to drain out by gravity or forcing it out by compressed air, or gas.

While I have described one specific embodiment of my invention, it will be understood that I do not wish to be limited exactly thereto, since various modifications may be made without departing from the scope of my invention, as defined by the following claims.

I claim:

1. A method of cold-reducing metal tubing, characterized by the use of solid wax inside the tubing during the reducing operation as an internal support for the tubing.

2. A method of cold-reducing metal tubing, characterized by the use of solid wax inside the tubing during the reducing operation as an internal support for the tubing, and by the removal of heat from the tubing resulting from the cold-working, with sufficient promptness to maintain the viscosity of the wax to a degree permitting it to function as such support.

3. A method of cold-reducing metal tubing, characterized by the use of a highly viscous fluid inside the tubing during the reducing operation as an internal support for the tubing, and by cooling the tubing to control the viscosity of this fluid.

JOHN W. OFFUTT.